March 21, 1961 R. D. KAUFFMAN 2,975,481
MOLD
Filed Aug. 10, 1956
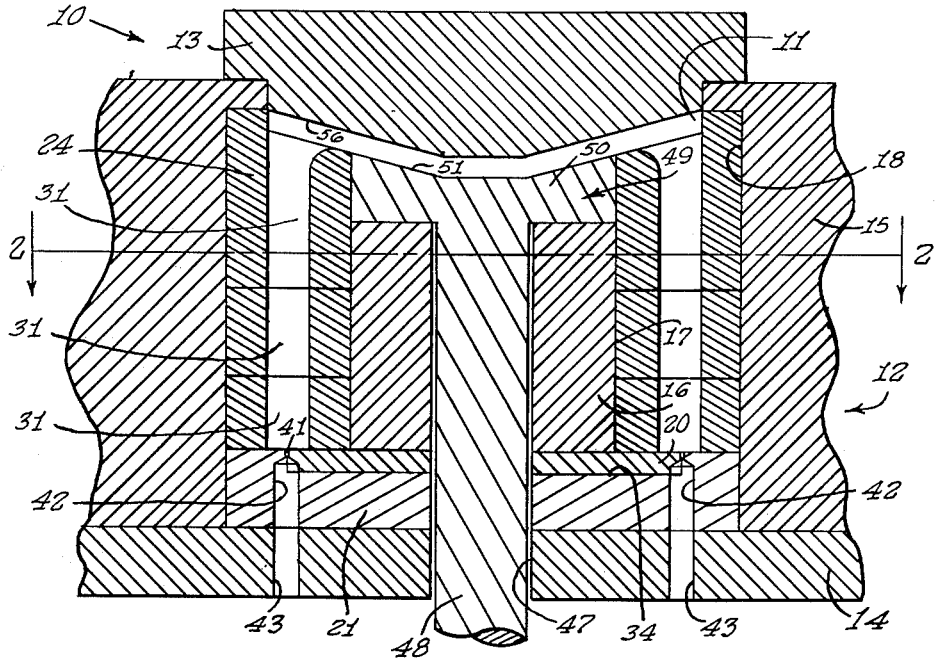
Fig. 1.
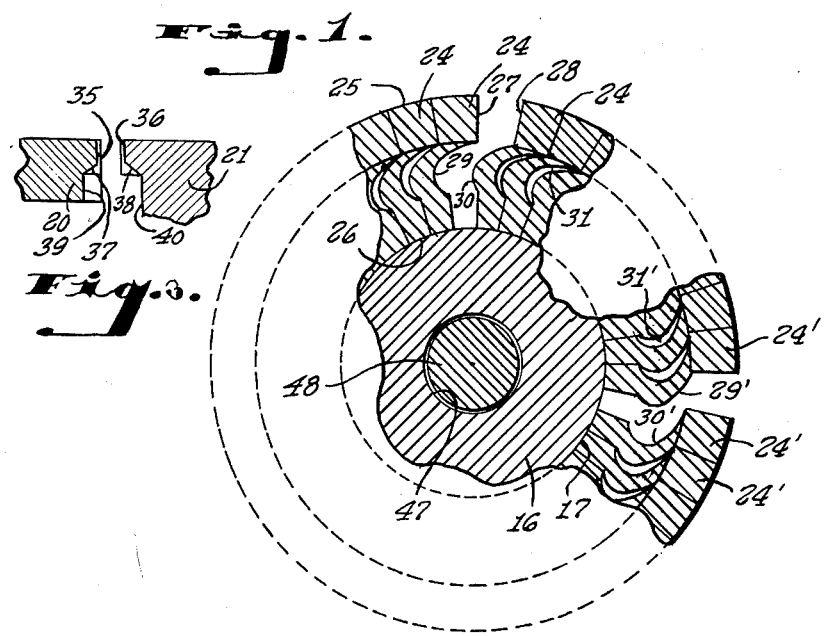
Fig. 3.
Fig. 2.
INVENTOR.
ROBERT D. KAUFFMAN
BY Harold B. Hood
ATTORNEY United States Patent Office 2,975,481
Patented Mar. 21, 1961

2,975,481
MOLD
Robert D. Kauffman, La Porte, Ind., assignor, by mesne assignments, to Denbo Engineering and Sales Company, Inc., Indianapolis, Ind., a corporation of Indiana
Filed Aug. 10, 1956, Ser. No. 603,426
12 Claims. (Cl. 18—42)

This invention relates to an improved molding apparatus; this molding apparatus being particularly well-suited for molding blower wheels or similar devices having a number of long, slender parts extending axially from a common base. By way of example, my novel molding apparatus may be utilized to mold, with remarkable efficiency and facility, the radial flow air moving device which is the subject of copending application Serial No. 518,762, filed June 29, 1955, by Albert F. Denbo and James W. Schwier. Accordingly, the invention will be disclosed and described in the form of a preferred embodiment utilized to mold this radial flow air moving device; it being clear, of course, that the invention is not limited to this particular application.

An important object of my invention is to provide a molding apparatus permitting molding of a plurality of different parts of different sizes and shapes using the same basic mold parts in combination with selected ones of a plurality of removable and interchangeable mold parts.

A further object of my invention is to provide an improved molding apparatus having novel means providing for the escape of gases entrapped in the mold cavity or cavities during the molding process.

A further object is to provide a novel molding apparatus having unique means for stripping the molded article therefrom.

Further objects will become apparent as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a sectional view of a preferred form of molding apparatus embodying my invention;

Fig. 2 is a sectional view taken along line 2—2 of Fig. 1 and including a plurality of interchangeable segments, a portion of the body of the mold being omitted for clarity of illustration; and Fig. 3 is a slightly enlarged, fragmentary view illustrating a portion of the novel means embodied within my invention whereby gases entrapped in the mold cavity or cavities may escape from the molding apparatus to the circumambient atmosphere, the parts which form this portion being shown in relatively separated relationship.

Referring to Fig. 1, my novel molding apparatus 10 provides a hollow portion 11 which is of the shape of the article to be molded. Upon reference to the above-mentioned copending application, it will be apparent that hollow portion 11 is in the form of an upper, disc-shaped, hollow space having a plurality of hollow portions or cavities projecting downwardly and axially therefrom. Molding apparatus 10 includes a body 12 and a shouldered closure member 13. Body member 12 includes a base member 14 on which an outer body member 15 is fixedly disposed. Body member 15 may be formed in two halves along a convenient vertical plane of demarcation whereby the two halves may be separated for the removal and interchange or replacement of mold parts later to be described. A body member 16 having an exterior, cylindrical surface 17 is disposed within the confines of body member 15. Body member 16 is disposed on member 20 which is seated in recessed or socketed member 21, and member 21 is mounted on base member 14 as shown in Fig. 1. Cylindrical surface 17 of body member 16 is laterally or radially spaced from, and inwardly of, an interior, cylindrical surface 18 provided by body member 15 to form an annular, hollow chamber within body 12 of the molding apparatus; said chamber opening at its top to the exterior of body 12.

Disposed within the annular, hollow chamber provided by body 12 is a removable means comprising a plurality of stacked, annular tiers disposed in relatively adjacent, mutually coaxial relationship. Fig. 2 shows an annular tier, a portion of which is formed from a plurality of arcuate segments 24 and a portion of which is formed from a plurality of arcuate segments 24'. In practice, each tier will be ordinarily formed of a series of mutually identical segments. Each of arcuate segments 24 includes a radially outer surface 25 which interfits with a portion of cylindrical surface 18 of body member 15. Also, each arcuate segment 24 includes a radially inner surface 26 which interfits with a portion of cylindrical surface 17 provided by body member 16.

Each arcuate segment has external surfaces 27 and 28 which respectively interfit with the adjacent external surface of the adjacently disposed arcuate segment. External surfaces 27 and 28 include a generally curved surface 29 and 30, respectively. As is apparent from Fig. 2, the curved surface 29 of one arcuate segment 24 forms with the curved surface 30 of the next adjacent arcuate segment, an internal, hollow, air foil shape or cavity 31. As is apparent from Fig. 1, aligned cavities 31 provided by the group of stacked tiers combine to form a plurality of continuous cavities of substantial length which communicate at their upper ends with the remainder of hollow portion 11. To "build up" a group of stacked tiers as shown in Fig. 1, the two halves which form body member 15 are separated, the segments are properly arranged about body member 16, and the halves are again moved together where they are subsequently rigidly secured.

To form a blower wheel having blades curved oppositely with respect to the curvature of the blades of the blower wheel molded when segments 24 are used, the tiers may be formed with arcuate segments 24'. Segments 24' are similar in shape to arcuate segments 24, but provide curved internal surfaces 29' and 30', respectively, or reversed curvature to provide cavities 31' which curve in a direction opposite to that of cavities 31. Obviously, a plurality of tiers formed with arcuate segments 24 may be substituted for a like number of tiers formed with arcuate segments 24', and vice versa, depending upon the particular direction of curvature desired in the blades of the radial flow air moving device to be molded.

The improved means provided by my invention for the escape of gases entrapped in the molding cavity or cavities will now be described. As is apparent from Fig. 1, a generally circular recess 34 is provided in the upper surface of annular member 21 within which annular member 20 is seated. Referring to Fig. 3 along with Fig. 1, it will be apparent that members 20 and 21 form a tier when interfitted with each other, defining a floor for the several cavities 31, and that the respective vertical interfitting surfaces of members 20 and 21 include a plurality of narrow, mating grooves 35 and 36, respectively. Each of narrow grooves 35 merges with a respective tapered portion 37 which respectively merges with a relatively deep groove 39. Likewise, each of narrow grooves 36 merges with a respective tapered portion 38 which respectively merges with a relatively deep groove 40. It is apparent that with members 20 and 21 in the operative position shown in Fig. 1, each of narrow grooves 35 mates with a corresponding groove 36 to form a narrow passageway 41 which merges through a tapered portion with a comparatively large passageway 42. Each passageway 42 is aligned with a passageway 43 in the base member 14. Accordingly, each narrow passageway 41 communicates with and between a mold cavity 31 and the circumambient atmosphere through a passageway 42 and a passageway 43. By this construction any gases entrapped in the mold cavity or cavities may escape to the circumambient atmosphere. Passageways 41 are of sufficiently small cross-sectional area that passage therethrough of the molding material is effectively inhibited. It is apparent then that the deleterious effects of entrapped gas in the mold cavity or cavities during the molding process, which are well known to those skilled in the art, are successfully avoided by this improved construction. It will be noted that since members 20 and 21 are removable from the remainder of the molding apparatus and are separable with respect to each other, the narrow passageways 41 may be readily and easily cleaned by cleaning each of the grooves 35 and 36 while members 20 and 21 are separated from each other.

Disposed in and guided for vertical movement by a cylindrical guideway 47 formed by annular members 16, 20, 21 and 14, is the stem 48 of an ejector 49. Ejector 49 of the embodiment shown in Fig. 1 includes a flange 50, the upper surface 51 of which forms a portion of the molding surface for the article to be molded. Ejector 49 is movable toward and away from the portion of the hollow chamber 11 which opens to the exterior of body 12. It will be apparent that after the article has been molded, closure member 13 may be removed upwardly, and ejector 49 may be subsequently moved upwardly to strip the molded article from the body 12 of the molding apparatus 10. Ejector 49 is effective to strip the molded article from body 12 with a minimum of warpage and/or breakage of the long, slender blades or vanes of the blower wheel because the ejecting force is applied by surface 51 over a substantial area of the blower wheel. Accordingly, the deleterious effects of conventional ejecting means, such as ejector pins or the like, are effectively avoided.

In operation, mold 10 is charged in any well known manner with molding material such as a suitable plastic composition. For example, a plurality of appropriately spaced injection apertures may be provided in closure member 13 through which the molding material is injected into the mold cavity. Alternatively, closure member 13 may be removed from body 12 and the molding material disposed in the mold cavity in any conventional manner before replacing the closure member; which may act to exert pressure upon the molding material to force it to flow into all parts of the mold cavity. After the article is molded, closure member 13 may be removed and ejector 49 may then be moved upwardly to strip the molded article from the mold.

My improved molding apparatus may be used to form a great variety of different articles of different sizes and shapes depending upon the particular form of segmental insert utilized. For example, if a blower wheel of the same general form as that molded from the apparatus shown in Fig. 1 but having uniform blades of a shorter length were desired, a thicker block 21, of any desired axial height may replace the illustrated block and one or more of the lowermost tiers of segments 24 or 24'.

To avoid unnecessarily complicating the drawing, the means which is utilized to secure body members 16, 20, 21 and 15 to base member 14 have been omitted from Fig. 1. It will be readily apparent to those skilled in the art that any conventional means can be used. For example, bolts can be inserted through aligned apertures in members 14, 21 and 20, and then into tightened engagement with threaded sockets in member 16 to secure these parts together. Likewise, bolts could be inserted through apertures in member 14 and then into tightened engagement with threaded sockets in body member 15 to secure both halves of member 15 to base member 14.

Whereas my improved molding apparatus is particularly well-adapted to mold articles from resinous or other plastic compositions, it is obvious that metallic, ceramic and other compositions may be molded with this apparatus.

I claim as my invention:

1. A mold comprising body means providing a plurality of spaced, internal surfaces defining, in part, a hollow chamber, removable means having exterior surfaces complementary in shape to and interfitting with said spaced, internal surfaces, said removable means comprising a plurality of cooperating tiers, certain of said tiers having internal surfaces defining hollow cavities of the shape of the article to be molded.

2. A mold comprising body means providing a plurality of spaced, internal surfaces defining, in part, a hollow chamber, removable means having exterior surfaces complementary in shape to and interfitting with said spaced, internal surfaces, said removable means comprising a plurality of cooperating tiers, each tier having internal surfaces defining, with the internal surfaces of the remaining tiers, hollow cavities of the shape of the article to be molded.

3. A mold comprising body means providing a plurality of spaced, internal surfaces defining, in part, a hollow chamber, removable means having exterior surfaces complementary in shape to and interfitting with said spaced, internal surfaces, said removable means comprising a plurality of cooperating tiers, each tier including a plurality of interfitting, separable segments defining hollow portions, the hollow portions of each tier forming, with the hollow portions of the other tiers, hollow cavities of the shape of the article to be molded.

4. A mold comprising body means providing a plurality of spaced, internal surfaces defining, in part, a hollow chamber, removable means having exterior surfaces complementary in shape to and interfitting with said spaced, internal surfaces, said removable means comprising a plurality of cooperating tiers, at least one of said tiers having internal surfaces defining hollow cavities of the shape of the article to be molded and at least one of said tiers comprising a substantially solid member cooperating with a tier which defines hollow cavities to provide a closure for said hollow cavities.

5. The mold as set forth in claim 4 wherein each of said tiers comprises a plurality of separable segments, each of said segments being disposed in mutually interfitting relationship with those adjacent thereto.

6. A mold comprising body means providing an internal cavity for the reception of the material to be molded, a portion of said cavity being defined by a first and a second member, said first member providing a recess, said second member being seated in said recess and having a surface interfitting with a surface of said first member, each of said interfitting surfaces including a plurality of narrow grooves and a plurality of comparatively larger grooves, each of said narrow grooves communicating with one of said comparatively larger grooves and mating with a narrow groove on the other of said members to form a narrow passageway communicating through a comparatively larger passageway with and between said internal cavity and the exterior of the mold.

7. A mold comprising body means providing an internal cavity for the reception of the material to be molded, the floor of said cavity being defined by a socketed member and means snugly and removably seated in the socket of said member, the perimetral surface of said means and the internal boundary surface of said socket being formed, respectively, with a plurality of grooves, each such groove in said surface of said member mating with a similar groove in said surface of said means to form a narrow passageway communicating with and between said cavity and the exterior of the mold whereby gases entrapped in the cavity during the molding process may escape through said passageway to the circumambient atmosphere.

8. A mold comprising body means providing a plurality of spaced, internal surfaces defining, in part, a hollow chamber, the floor of said chamber being defined by a first member providing a recess and a second member seated in said recess and having a surface interfitting with a surface of said first member, removable means having exterior surfaces complementary in shape to and interfitting with said spaced, internal surfaces, said removable means having internal surfaces defining hollow portions of the shape of the article to be molded, each of said first-mentioned interfitting surfaces providing a plurality of narrow grooves, each groove mating with a similar groove provided in the surface interfitted therewith to form a plurality of narrow passageways communicating with and between said hollow portions and the exterior of the mold whereby gases entrapped in said hollow portions during the molding process may escape through said passageway to the circumambient atmosphere.

9. The mold as set forth in claim 8 wherein said removable means comprises a plurality of adjacent, separable tiers, each of said tiers comprising a plurality of separable segments, each segment being disposed in mutually interfitting relationship with those adjacent thereto.

10. A mold comprising body means, said body means providing a hollow chamber surrounding an inner body section and opening to the exterior of said body means, said body section including an ejector arranged coaxially with respect to an article to be molded, a distal surface of said ejector forming a substantial central portion of the molding surface for the article to be molded, said body means including means mounting said ejector for movement toward and away from the portion of said chamber which opens to the exterior of said body means to strip the molded article from the mold.

11. A mold comprising body means, said body means providing a hollow chamber surrounding an inner body section and opening to the exterior of said body means, a portion of said chamber being filled with removable means comprising a plurality of adjacent, separable tiers, each of said tiers comprising a plurality of separable segments, each segment being disposed in mutually interfitting relationship with those adjacent thereto, the interfitting surfaces of the segments of one of said tiers providing internal surfaces defining portions of the molding surface for the article to be molded, said body section including an ejector, a distal surface of said ejector forming another portion of the molding surface, said body means including means mounting said ejector for movement toward and away from the portion of said chamber which opens to the exterior of the body means to strip the molded article from the mold.

12. A mold comprising body means, said body means providing a hollow chamber surrounding an inner body section and opening to the exterior of said body means, a portion of said chamber being filled with removable means comprising a plurality of adjacent, separable tiers, each of said tiers comprising a plurality of separable segments, each segment being disposed in mutually interfitting relationship with those adjacent thereto, the interfitting surfaces of the segments of each of said tiers providing internal surfaces defining portions of the molding surface for the article to be molded, said body section including an ejector, a distal surface of said ejector forming another portion of the molding surface, said other portion being substantial in size and centrally located of the article to be molded, said body means including means mounting said ejector for movement toward and away from the portion of said chamber which opens to the exterior of the body means to strip the molded article from the mold, a portion of said chamber being defined by a first and second member, said first member providing a recess, said second member being seated in said recess and having a surface interfitting with a surface of said first member, each of said interfitting surfaces including a plurality of narrow grooves and a plurality of comparatively larger grooves, each of said narrow grooves communicating with one of said comparatively larger grooves and mating with a narrow groove on the other of said members to form a narrow passageway communicating through a comparatively larger passageway with and between said hollow chamber and the exterior of the mold.

References Cited in the file of this patent

UNITED STATES PATENTS

| | | |
|---|---|---|
| 853,334 | Backstrom | May 14, 1907 |
| 2,347,773 | Franz | May 2, 1944 |
| 2,378,586 | Schultz | June 19, 1945 |
| 2,396,406 | Anderson | Mar. 12, 1946 |
| 2,399,117 | Hart | Apr. 23, 1946 |
| 2,485,421 | Timpe | Oct. 18, 1949 |
| 2,541,923 | Huxham | Feb. 13, 1951 |
| 2,554,499 | Poulter | May 29, 1951 |
| 2,652,190 | Meltzer et al. | Sept. 15, 1953 |

FOREIGN PATENTS

| | | |
|---|---|---|
| 284,680 | Great Britain | Oct. 18, 1928 |